(12) United States Patent
Bamdad

(10) Patent No.: US 10,042,088 B2
(45) Date of Patent: Aug. 7, 2018

(54) OPTICAL DEVICES AND METHODS INVOLVING NANOPARTICLES

(75) Inventor: Cynthia C. Bamdad, Boston, MA (US)

(73) Assignee: Minerva Biotechnologies Corporation, Waltham, MA (US)

( * ) Notice: Subject to any disclaimer, the term of this patent is extended or adjusted under 35 U.S.C. 154(b) by 0 days.

(21) Appl. No.: 11/157,206

(22) Filed: Jun. 20, 2005

(65) Prior Publication Data

US 2006/0007791 A1    Jan. 12, 2006

Related U.S. Application Data

(63) Continuation of application No. PCT/US03/41258, filed on Dec. 22, 2003.

(Continued)

(51) Int. Cl.
*G02B 1/11* (2015.01)
*B82Y 10/00* (2011.01)
(Continued)

(52) U.S. Cl.
CPC ............ *G02B 1/11* (2013.01); *B82Y 10/00* (2013.01); *B82Y 20/00* (2013.01); *B82Y 30/00* (2013.01);
(Continued)

(58) Field of Classification Search
USPC .......... 422/82.05–82.09; 250/216, 225, 226; 356/10, 414, 416, 40, 237, 308, 359;
(Continued)

(56) References Cited

U.S. PATENT DOCUMENTS 4,779,961 A * 10/1988 DeMartino ............. C08F 20/36
                                                    252/299.01
4,978,476 A    12/1990 Allen et al.
(Continued)

FOREIGN PATENT DOCUMENTS

WO    WO 96/29629 A2    9/1996
WO    WO 00/04593       1/2000
(Continued)

OTHER PUBLICATIONS

Laibinis, P. et al., 1989, "Orthogonal Self-Assembled Monolayers: Alkanethiols on Gold and Alkane Carboxylic Acids on Alumina," Science 245: 845-847.
(Continued)

*Primary Examiner* — Melanie Yu Brown
*Assistant Examiner* — Richard Moerschell
(74) *Attorney, Agent, or Firm* — JHK Law; Joseph Hyosuk Kim

(57) ABSTRACT

The present invention relates generally to optical materials and applications of optical materials and, more particularly, to optical materials incorporating particles such as nanoparticles, methods of forming such materials, and applications of such materials in various devices, for example, for filters, displays, coatings for glare reduction, and the like. The present invention can provide control over fabrication dimensions at very small scale, for example, at the molecular scale rather than at a macroscopic scale. The invention also involves, in some cases, controlling the interaction of many wavelengths of electromagnetic radiation with these materials. The optical materials and devices of the invention may be constructed and arranged for a response to, control of, and/or interaction with essentially any electromagnetic radiation, electric field, and/or magnetic field.

20 Claims, 3 Drawing Sheets

Related U.S. Application Data

(60) Provisional application No. 60/435,952, filed on Dec. 20, 2002.

(51) Int. Cl.
    *B82Y 20/00* (2011.01)
    *B82Y 30/00* (2011.01)
    *G02B 1/10* (2015.01)
    *G02B 5/20* (2006.01)
    *G02F 1/17* (2006.01)
    *G11B 7/242* (2006.01)

(52) U.S. Cl.
    CPC ............... *G02B 1/10* (2013.01); *G02B 5/20* (2013.01); *G02B 5/206* (2013.01); *G02F 1/17* (2013.01); *G11B 7/242* (2013.01); *G02F 2203/10* (2013.01)

(58) Field of Classification Search
    USPC ............... 359/237, 308, 359; 435/287.8
    See application file for complete search history.

(56) References Cited

U.S. PATENT DOCUMENTS

| | | | |
|---|---|---|---|
| 4,986,635 A | 1/1991 | Spry | |
| 5,452,123 A * | 9/1995 | Asher | B82Y 20/00 359/296 |
| 5,512,131 A | 4/1996 | Kumar et al. | |
| 5,563,738 A | 10/1996 | Vance | |
| 5,620,850 A | 4/1997 | Bamdad et al. | |
| 6,014,246 A | 1/2000 | Asher et al. | |
| 6,139,626 A | 10/2000 | Norris et al. | |
| 6,277,489 B1 * | 8/2001 | Abbott | B01J 20/0233 427/217 |
| 6,323,989 B1 * | 11/2001 | Jacobson | B41J 2/01 345/107 |
| 6,326,108 B2 | 12/2001 | Simons | |
| 6,355,198 B1 | 3/2002 | Kim et al. | |
| 6,455,103 B1 | 9/2002 | Mennig et al. | |
| 6,541,617 B1 * | 4/2003 | Bamdad et al. | 536/23.1 |
| 7,476,501 B2 * | 1/2009 | Chan | C12Q 1/6869 435/6.1 |
| 2002/0050976 A1 | 5/2002 | Yamaguchi et al. | |

FOREIGN PATENT DOCUMENTS

| | | |
|---|---|---|
| WO | WO 00/43783 A2 | 7/2000 |
| WO | WO 00/43791 A2 | 7/2000 |
| WO | WO 01/78709 A2 | 10/2001 |

OTHER PUBLICATIONS

Bain, C. et al., 1989, "Formation of Monolayers by the Coadsorption of Thiols on Gold: Variation in the Head Group, Tail Goup, and Solvent," J. Am. Chem. Soc. 111(18): 7155-7164.

Bain, C. and Whitesides, G., 1989, "Formation of Monolayers by the Coadsorption of Thiols on Gold: Variation in the Length of the Alkyl Chain," J. Am. Chem. Soc. 111(18): 7164-7175.

Homola, J. et al., 1999, "Surface plasmon resonance sensors: review," Sensors and Actuators B 54: 3-15.

Nikolaides, M.G. et al., 2002, "Electric-field-induced capillary attraction between like-charged particles at liquid interfaces," Nature 420: 299-301.

\* cited by examiner

OPTICAL DEVICES AND METHODS INVOLVING NANOPARTICLES

RELATED APPLICATIONS

This application is a continuation of PCT International Application No. PCT/US2003/041258, filed Dec. 22, 2003 which claims priority to U.S. application Ser. No. 60/435,952, filed Dec. 20, 2002.

FIELD OF THE INVENTION

The present invention relates generally to optical materials and applications of optical materials, opto-electrical materials and, more particularly, to optical materials incorporating particles such as nanoparticles, methods of forming such materials, and applications of such materials in various devices.

BACKGROUND OF THE INVENTION

The interaction of electromagnetic radiation with materials is a well-studied field, and has led to significantly valuable contributions in the areas of optical displays, optical filters, the optical transmission and storage of information, and the like. See, for example, E. Yablonovitch, "Photonic Crystals," *Scientific American*, December 2001, pp. 47-55. While the potential of electromagnetic crystal structures and metallo-dielectric structures is very high, methods of forming these materials may be complex and difficult to transfer to manufacturing, Methods of forming structured optical materials range from constructing materials with voids and filling those voids (see, for example, U.S. Pat. No. 6,139,626 to Norris et al., issued on Oct. 31, 2000; and V. Colvin, *From Opals to Optics, Photonics and Electromagnetic Crystal Structures IV*, Abstract Book, p. 23, Oct. 28-31, 2002, Los Angeles, Calif.) to the printing of metallic patches on dielectric layers to form artificial dielectrics. Applications of nanostructured materials include, for example, RF antennas and reflectors, nanoscopic lasers, optical filters, optical switches, displays, materials for glare reduction, and materials for stealth coatings for military equipment.

Optical filters may be constructed in a variety of ways. One type of optical filter uses layers of non-conductive materials of differing dielectric constants. In this approach, incident light, which may be polychromatic, passes through a first material of first dielectric constant, to an interface with a second material characterized by a second dielectric constant. If the second dielectric constant is greater than the first dielectric constant, then a portion of the incident light may be reflected back through the first material. If the difference in dielectric constant between the two materials is large, then a significant portion of the incident light may be reflected. The magnitude of the reflected light may be dependent on, for example, whether the returning light is in or out of phase with the transmitted light. Thus, the magnitude of the reflected light may be a function of at least the wavelength of the incident light, path length through the first material, dielectric constant of the first material, and/or the difference in dielectric constant between the first and second materials.

Optical filters having various arrangements of multiple layers may be constructed where the dielectric constant of the various layers, pathlengths through various layers, and the like are selected such that the overall arrangement filters out light of one or more selected wavelengths, while allowing passage of one or more different wavelengths. Certain filters can be constructed such that light of only a narrow wavelength is transmitted, so that light of only a narrow wavelength is reflected, and/or essentially any combination of predetermined reflected and transmitted light.

Another optical filter technique involves the use of metals and/or other conductive surfaces. In this approach, light may be transmitted through a first material of a first dielectric constant, to a second material of a second dielectric constant. A thin metal film can be used to separate the first and second materials. At boundaries where the dielectric and conductive properties of the materials change abruptly, the propagation of electromagnetic waves at the boundary may result in a boundary charge wave. The collective excitations of electrons (i.e., the charge wave) at the interface on which the metal film is deposited is typically referred to as surface plasmons. At a certain angle (and at a predetermined polarization), the interaction between the transmitted or evanescent waves, and the surface plasmon may satisfy a certain resonant condition. For example, at a certain angle, incident light may couple with the surface plasmon of the metal layer and maximize the magnitude of the transmitted light relative to the reflected light. Similarly, at a particular angle, the reflected light may be at a maximum. The minima and/or maxima of transmitted or reflected light typically are a function of the thickness of the metal film, the dielectric constant of the second material, and/or the angle or wavelength of the incident light. Properties such as the thickness of the metal and/or the dielectric constant of the second material can be adjusted in many cases to tailor the wavelength of the transmitted or reflected light. For example, these properties can be adjusted to create a filter that allows the transmission of a narrow band wavelength of light, to reflect only a narrow wavelength of light, or the like.

Optical displays can take a variety of forms. In several types of optical displays, an image is comprised of many pixels which, when selectively turned on or off, or varied in color, produces an overall image. For example, a display may include a matrix having a large number of light emitters which, when selectively turned on or off, or varied in color, produces an image. As another example, electroluminescent displays involve many tiny electrochemical components arranged in a matrix. When various of the components are electronically activated, they can emit light of a particular wavelength, creating an overall image across the display. In some displays, each pixel comprises three different light emitters, representing the three primary colors. For each pixel, activation of one or more of the emitters, at one or more predetermined intensities, can create emission of light of essentially any color from that pixel. An array of pixels, arranged in a matrix in a display, can provide the ability to display essentially any image. In other displays, the emitters emit "white" light and filters provide the same capability of generating light comprised of a predetermined quantity of each of the primary colors.

In some applications where glare reduction is desired, one common technique for glare reduction is to vary (e.g., randomly) the thickness of a glare-resistant layer over another surface. For example, glare-resistant glass for use over pictures typically is a glass layer of varying thickness which can cause random light scattering and/or random reflection of light of various wavelengths, such that no single "glare" mode of reflected light can be maximized. In another technique for glare reduction, materials of varying dielectric constants are layered at different thickness, such that light reflected off the material is not in phase, such that destructive interference of the light diminishes the magnitude of the reflected light.

In another technique for glare reduction, a surface is made glare-resistant by coating it with a polymer mixture that results in islands of polymer distributed across the surface. The polymer mixture can include a first type of polymer that adheres to the surface, and a second, segregating polymer which, through incompatibility with the first polymer, or the like causes segregation of the first polymer into individual or separate regions. The first polymer may be provided with chemical functionality, causing it to adhere to the surface, while the second polymer may be of a chemical functionality that allows it to be rinsed away or otherwise removed after polymer segregation. Alternatively, the second polymer may remain on the surface to separate the first polymer into individual or separate regions. In many cases, tiny "islands" or regions of polymer are produced that are distributed across the surface, which can cause random light scattering, similar to the above-described glare-resistant picture glass. In some cases, a random distribution of polymer may define altered dielectric constants, which can cause destructive interference of transmitted or reflected light of a predetermined wavelength or random wavelengths, thus minimizing glare. In certain instances, a random distribution of polymer can result in other altered optical properties that can reduce glare.

SUMMARY OF THE INVENTION

The subject matter of this application may involve, in some cases, interrelated products, alternative solutions to a particular problem, and/or a plurality of different uses of a single system or article.

In one aspect, the invention includes a device. In one set of embodiments, the device is a device that includes at least two layers constructed and arranged to receive incident electromagnetic radiation and transmit at least a first wavelength of the incident radiation preferentially relative to at least a second wavelength of the incident radiation via interaction of the radiation at a region proximate an interface of the at least two layers. In some cases, the filter may further include a plurality of particles positioned to interact with the electromagnetic radiation, so as to affect the preferential transmission of the first wavelength of radiation relevant to the second wavelength of radiation.

In another set of embodiments, the invention includes a device including a component constructed and arranged to affect an electric, magnetic and/or electromagnetic field. The component may comprise a plurality of particles arranged to interact with the field and affect interaction of the field with the device. In yet another set of embodiments, the device may include a plurality of pixels constructed and arranged to individually and differentially affect a proximal electric, magnetic, and/or electromagnetic field. In some cases, at least some of the pixels comprise particles positioned to affect the field proximal that pixel. The device, in still another set of embodiments, includes a surface that comprises particles differentially positioned with respect to the surface to define a plurality of regions of the surface that differentially affect a proximal electromagnetic field.

In another embodiment, the invention involves a device comprising a surface comprising particles differentially positioned with respect to the surface to define a plurality of regions of the surface that differentially affect a proximal electromagnetic field.

In another aspect, the invention includes a method. In one set of embodiments, the method is a method of making a device for interaction with an electric, magnetic, or electromagnetic field. The method includes arranging a plurality of nanoparticles at least some of which are linked to species responsive to an electric, magnetic, or electromagnetic field, and exposing the particles to an electric, magnetic, or electromagnetic field thereby adjusting the spatial relationship between at least some of the particles relative to others of the particles.

In another embodiment, the invention involves a method of making a device for interaction with an electric, magnetic, or electromagnetic field. The method comprises arranging a plurality of nanoparticles at least some of which are linked to species responsive to an electric, magnetic, or electromagnetic field, and exposing the particles to an electric, magnetic, or electromagnetic field thereby adjusting the spatial relationship between at least some of the particles relative to others of the particles. The method can involve species that are molecules covalently attached to the nanoparticles. Also, the method can involve applying an electric, magnetic, or electromagnetic field to a plurality of molecules responsive to the field to arrange the molecules in a configuration dictated by the field, and combining nanoparticles with the molecules and causing at least some of the nanoparticles to attach to the molecules thereby forming a matrix of the nanoparticles arranged in a predetermined geometrical arrangement.

Other advantages, features, and uses of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. Most of the figures are side views either in elevational or cross-sectional perspective. In many cases the devices will look identical from side elevational perspective as compared with cross-section. Those of ordinary skill in the art will understand the invention from these drawings, whether considered as side view or cross-sectional. In cases where the present specification and a document incorporated by reference include conflicting disclosure, the present specification shall control.

DETAILED DESCRIPTION OF THE INVENTION

Figure 1:
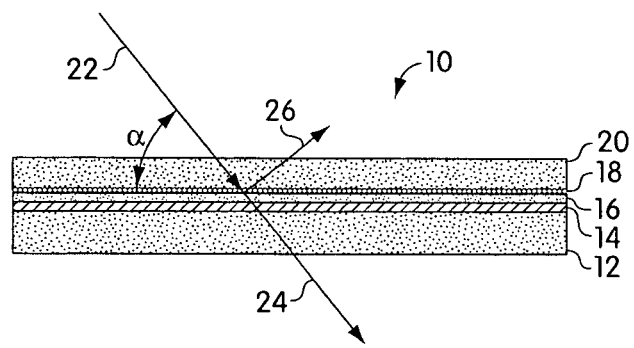
FIG. 1 is a side view of an optical component incorporating a layer of optical material in accordance with an embodiment of the invention.

Each of the following documents is incorporated herein by reference: International patent application serial number PCT/US01/12484, filed Apr. 12, 2001 by Bamdad et al., entitled "Treatment of Neurodegenerative Disease" (International patent publication WO 01/78709, published Oct. 25, 2001); International patent application serial number PCT/US00/01997, filed Jan. 25, 2000 by Bamdad et al., entitled "Rapid and Sensitive Detection of Aberrant Protein Aggregation in Neurodegenerative Diseases" (International patent publication WO 00/43791, published Jul. 27, 2000); International patent application serial number PCT/US00/01504, filed Jan. 21, 2000 by Bamdad, et al., entitled "Interaction of Colloid-Immobilized Species with Species on Non-Colloidal Structures" (International patent publication WO 00/43783, published Jul. 27, 2000); U.S. Pat. No. 5,512,131, issued Apr. 30, 1996 to Kumar and Whitesides; U.S. Pat. No. 6,355,198, issued Mar. 12, 2002 to Kim, et al; and U.S. Pat. No. 5,620,850, issued Apr. 15, 1997 to Bamdad, et al.

The following definitions will aid understanding of the invention, and discussion of their context in the invention enables the invention:

A "particle," as used herein, is given its ordinary meaning, i.e., an isolated, independent structure, for example, but not limited to, a bead or another generally spherical entity. In one set of embodiments, particles of the invention have a maximum dimension (cross-sectional, edge, or otherwise) no greater than 1 mm; in some cases, the maximum diameter is less than 500 µm; in other cases, less than 200 µm; in other cases, less than 50 µm; in other cases, less than 500 µm; in other cases, less than 200 nm; and in still other cases, less than 5 nm. Particles of the invention can be made of any material, e.g., inorganic or organic, polymeric, ceramic, semiconductor (e.g., silicon or GaAs), metallic (e.g., gold or silver), non-metallic, crystalline, amorphous, or a combination, and can include aggregates of molecules. The term "particles" is meant to include only those particles specifically added to articles of the invention for purposes of controlling the article's interaction with a magnetic, electric, and/or electromagnetic field, and/or other energy source as described herein. "Particles" as used herein specifically excludes dust or other contaminants, which may inherently be found in known articles as a result of manufacturing processes or colorants, impact modifiers, or other species which may be intentionally or inherently present in prior art articles for purposes other than those described herein.

A "fluid suspendable particle" means a particle that can be made to stay in suspension in a fluid in which it is used for purposes of the invention (typically an aqueous solution) by itself, or can be maintained in solution by application of a magnetic field, an electromagnetic field, agitation such as stirring, shaking, vibrating, sonicating, centrifuging, vortexing, or the like. A "magnetically suspendable" particle is one that can be maintained in suspension in a fluid via application of a magnetic field. An "electromagnetically-suspendable particle" is one that can be maintained in suspension in a fluid by application of an electromagnetic field (e.g., a particle carrying a charge, or a particle modified to carry a charge). A "self-suspendable particle" is a particle that is of low enough size and/or mass that it will remain in suspension in a fluid in which it is used (typically an aqueous solution), without assistance of, for example, a magnetic field, for at least 1 hour, or for an amount of time that it takes to perform a relevant assay. Other self-suspendable particles will remain in suspension, without assistance, for 5 hours, 1 day, 1 week, or even 1 month, in accordance with the invention.

A "magnetic" particle is a particle that is affected by a magnetic field, i.e., a force can be applied to the particle with a magnetic field. A "non-magnetic" particle is one to which a force can not be applied by a magnetic field.

"Colloid," as used herein, means nanoparticles, i.e., very small, self-suspendable or fluid-suspendable particles including those made of any material that is, e.g., inorganic or organic, polymeric, ceramic, semiconductor, metallic (e.g., gold), non-metallic, crystalline, amorphous, or a combination. Typically, colloid particles used in accordance with the invention are of less than 250 nm or 200 nm maximum dimension (cross section, edge, or any other dimension), more typically less than 100 nm or 50 nm, and in most cases are of about 2-30 nm maximum cross section. One class of colloids suitable for use in the invention is 10-30 nm in maximum cross section, and another about 2-10 nm in maximum cross section. As used herein this term includes the definition commonly used in the field of biochemistry. One type of colloid particle is a semiconductor nanocrystal, which is a particle of matter comprising a semiconductor, typically with a maximum dimension of less than 100 or 75 nanometers, and more typically less than 50 or 25 nanometers. A semiconductor nanocrystal may have a radius that is smaller than the bulk exciton Bohr radius. In a semiconductor nanocrystal, the addition or removal of an electron may change or alter its electronic properties. In certain semiconductor nanocrystals, these electronic properties may include fluorescence, or emission, of light, such as visible light, infrared light, ultraviolet light, or radio-frequency radiation.

As used herein, "nanoscopic-scale," "nanoscopic," "nanometer-scale," "nanoscale," the "nano-" prefix, and the like, generally refer to elements or articles having a maximum dimension (cross-sectional, edge, or otherwise) of less than about 1 micrometer, preferably less than about 100 nm in some cases.

The term "affinity tag" is given its ordinary meaning in the art. An affinity tag is any biological or chemical material that can readily be attached to a target biological or chemical material. Affinity tags may be attached to a target biological or chemical molecule by any suitable method. For example, in some embodiments, the affinity tag may be attached to the target molecule using genetic methods. For example, the nucleic acid sequence coding the affinity tag may be inserted near a sequence that codes a biological molecule; the sequence may be positioned anywhere within the nucleic acid that enables the affinity tag to be expressed with the biological molecule, for example, within, adjacent to, or nearby. In other embodiments, the affinity tag may also be attached to the target biological or chemical molecule after the molecule has been produced (e.g., expressed or synthesized). As one example, an affinity tag such as biotin may be chemically coupled, for instance covalently, to a target protein or peptide to facilitate the binding of the target to streptavidin.

Affinity tags include, for example, metal binding tags such as histidine tags, GST (in glutathione/GST binding), streptavidin (in biotin/streptavidin binding). Other affinity tags include Myc or Max in a Myc/Max pair, or polyamino acids, such as polyhistidines. At various locations herein, specific affinity tags are described in connection with binding interactions. The molecule that the affinity tag interacts with (e.g. binds to), which may be a known biological or chemical binding partner, is the "recognition entity." It is to be understood that the invention involves, in any embodiment employing an affinity tag, a series of individual embodiments, each involving selection of any of the affinity tags described herein.

A recognition entity may be any chemical or biological material that is able to bind to an affinity tag. A recognition entity may be, for example, a small molecule such as maltose (which binds to MBP, or maltose binding protein), glutathione, NTA/Ni$^{2+}$, biotin (which may bind to streptavidin), or an antibody. An affinity tag/recognition entity interaction may facilitate attachment of the target molecule, for example, to another biological or chemical material, or to a substrate. Examples of affinity tag/recognition entity interactions include polyhistidine/NTA/Ni$^{2+}$, glutathione S transferase/glutathione, maltose binding protein/maltose, streptavidin/biotin, biotin/streptavidin, antigen (or a fragment of an antigen)/antibody (or a fragment of an antibody), and the like.

As used herein, "chelate coordinating a metal" or metal coordinated by a chelate, refers to a metal coordinated by a chelating agent that does not fill all available coordination sites on the metal, leaving some coordination sites available for binding via a metal binding tag.

As used herein, "metal binding tag/metal/chelate linkage" defines a linkage between first and second species, in which a first species is immobilized relative to a metal binding tag and a second species is immobilized relative to a chelate, where the chelate coordinates a metal to which the metal binding tag is also coordinated. U.S. Pat. No. 5,620,850 of Bamdad, et al., incorporated herein by reference, describes various non-limiting examples of linkages.

A "moiety that can coordinate a metal," as used herein, means any molecule that can occupy at least two coordination sites on a metal atom, such as a metal binding tag or a chelate. Moieties that can coordinate metals, metal binding tag/metal/chelate linkages, and/or affinity tags can be used individually or together, and/or combined with other molecules, as will be recognized by those of skill in the art, to position molecules and/or nanoparticles in position to interact with energy in accordance with the invention.

The term "binding" refers to the interaction between a corresponding pair of molecules that exhibit mutual affinity or binding capacity, typically specific or non-specific binding or interaction, including biochemical, physiological, and/or pharmaceutical interactions. Biological binding defines a type of interaction that occurs between pairs of molecules including proteins, nucleic acids, glycoproteins, carbohydrates, hormones and the like. Specific examples include antibody/antigen, antibody/hapten, enzyme/substrate, enzyme/inhibitor, enzyme/cofactor, binding protein/substrate, carrier protein/substrate, lectin/carbohydrate, receptor/hormone, receptor/effector, complementary strands of nucleic acid, protein/nucleic acid repressor/inducer, ligand/cell surface receptor, virus/ligand, etc.

The term "binding partner" refers to a molecule that can undergo binding with a particular molecule. Biological binding partners are examples. For example, Protein A is a binding partner of the biological molecule IgG, and vice versa. Binding partners can be used, as will be recognized by those of skill in the art, to position molecules and/or nanoparticles in position to interact with energy in accordance with the invention. For example, a molecule can be fastened to each end of a linker molecule, a binding partner of that molecule can be fastened to colloid particles, and binding between the partners can then be exploited to link the particles to each other via the linker molecule. This technique can be used to link many different species to each other, and/or to position species relative to each other, in accordance with the invention. Linkers of essentially any length can be used, such as R—(CH$_2$)$_n$—R', where n is easily selected to provide a desired length, and R and R' can be the same or different and are chemical, biological, or biochemical species selected to bind to a desired entity.

As used herein, a component that is "immobilized relative to" another component either is fastened to the other component or is indirectly fastened to the other component, e.g., by being fastened to a third component to which the other component also is fastened, or otherwise is transitionally associated with the other component. For example, a signaling entity is immobilized with respect to a binding species if the signaling entity is fastened to the binding species, is fastened to a colloid particle to which the binding species is fastened, is fastened to a dendrimer or polymer to which the binding species is fastened, etc. A colloid particle is immobilized relative to another colloid particle if a species fastened to the surface of the first colloid particle attaches to an entity, and a species on the surface of the second colloid particle attaches to the same entity, where the entity can be a single entity, a complex entity of multiple species, a cell, another particle, etc.

As used herein, "fastened to or adapted to be fastened," in the context of a species relative to another species or to a surface of an article, means that the species is chemically or biochemically linked via covalent attachment, attachment via specific biological binding (e.g., biotin/streptavidin), coordinative bonding such as chelate/metal binding, or the like. For example, "fastened" in this context includes multiple chemical linkages, multiple chemical/biological linkages, etc., including, but not limited to, a binding species such as a peptide synthesized on a polystyrene bead, a binding species specifically biologically coupled to an antibody which is bound to a protein such as protein A, which is attached to a bead, a binding species that forms a part (via genetic engineering) of a molecule such as GST or Phage, which in turn is specifically biologically bound to a binding partner covalently fastened to a surface (e.g., glutathione in the case of GST), etc. As another example, a moiety covalently linked to a thiol is adapted to be fastened to a gold surface, since thiols can bind gold covalently. Similarly, a species carrying a metal binding tag is adapted to be fastened to a surface that carries a molecule covalently attached to the surface (such as thiol/gold binding) which molecule also presents a chelate coordinating a metal. A species also is adapted to be fastened to a surface if a surface carries a particular nucleotide sequence, and the species includes a complementary nucleotide sequence.

"Covalently fastened" means fastened via nothing other than one or more covalent bonds. As one example, a species that is covalently coupled, via EDC/NHS chemistry, to a carboxylate-presenting alkyl thiol which is in turn fastened to a gold surface, is covalently fastened to that surface.

"Specifically fastened" or "adapted to be specifically fastened" means a species is chemically or biochemically linked to another specimen or to a surface as described above with respect to the definition of "fastened to or adapted to be fastened," but excluding all non-specific binding.

The term "self-assembled monolayer" (SAM) refers to a relatively ordered assembly of molecules spontaneously chemisorbed on a surface, in which the molecules are oriented approximately parallel to each other and roughly perpendicular to the surface. Each of the molecules includes a functional group that adheres to the surface, and a portion that interacts with neighboring molecules in the monolayer to form the relatively ordered array. See, e.g., Laibinis, P. E., Hickman, J., Wrighton, M. S., Whitesides, G. M., *Science,* 245:845 (1989); Bain, C., Evall, J., Whitesides, G. M., *J. Am. Chem. Soc.,* 111:7155 (1989); Bain, C., Whitesides, G. M., *J. Am. Chem. Soc.,* 111:7164-7175 (1989); U.S. Pat. No. 5,512,131, issued Apr. 30, 1996 to Kumar and Whitesides, and International Patent Publication No. WO 96/29629, published Jun. 26, 1996 (Whitesides, et al.), each of which is incorporated herein by reference. Examples of self-assembled monolayers include thiols which adhere to gold surfaces. As specific examples, hexadecanethiol (HS—$(CH_2)_{15}$—$CH_3$) will form ordered, self-assembled monolayers on gold surfaces. Similar molecules including different chain lengths also may form SAMs. The exposed ends of the molecules (e.g., the ends opposite —SH) can be provided with essentially any chemical functionality such as —OH, —$(OCH_2CH_2)_n$—OH, chelating agents that coordinate metal ions for subsequent linkage, and the like.

Certain embodiments of the invention make use of self-assembled monolayers (SAMs) on surfaces, such as surfaces of colloid particles, and articles such as colloid particles having surfaces coated with SAMs. In one set of embodiments, SAMs formed completely of synthetic molecules completely cover a surface or a region of a surface, e.g., completely cover the surface of a colloid particle. "Synthetic molecule," in this context, means a molecule that is not naturally occurring; rather, one synthesized under the direction of human, human-created or human-directed control. "Completely cover" in this context means that there is no portion of the surface or region that directly contacts a protein, antibody, or other species that prevents complete, direct coverage with the SAM. For example, in certain embodiments, the surface or region includes, across its entirety, a SAM consisting completely of non-naturally-occurring molecules (i.e., synthetic molecules). The SAM can be made up completely of SAM-forming species that form close-packed SAMs at surfaces, or these species in combination with molecular wires or other species able to promote electronic communication through the SAM (including defect-promoting species able to participate in a SAM), or other species able to participate in a SAM, and/or any combination of these. In some cases, all of the species that participate in the SAM include a functionality that binds, optionally covalently, to the surface, such as a thiol which will bind to a gold surface covalently. A self-assembled monolayer on a surface, in accordance with the invention, can be comprised of a mixture of species (e.g., thiol species when gold is the surface) that can present (expose) essentially any chemical or biological functionality. For example, they can include tri-ethylene glycol-terminated species (e.g., tri-ethylene glycol-terminated thiols) to resist non-specific adsorption, and other species (e.g., thiols) terminating in a binding partner of an affinity tag, e.g., terminating in a chelate that can coordinate a metal such as nitrilotriacetic acid which, when in complex with nickel atoms, captures a metal binding tagged-species such as a histidine-tagged binding species. The present invention provides a method for rigorously controlling the concentration of essentially any chemical or biological species presented on a colloid surface or any other surface.

"Molecular wires," as used herein, means wires that enhance the ability for a medium encountering a SAM-coated article to communicate electrically with the article. This includes conductive molecules or molecules that can cause defects in the SAM allowing communication with the article. One pathway for electron conduction can be provided by a monolayer into which molecular wires (e.g. polymers of aromatic ring compounds) have been incorporated. A variety of molecules can be used for this purpose, including but not limited to poly(ethynylphenyl thiol) (i.e. $C_{16}H_{10}S$):

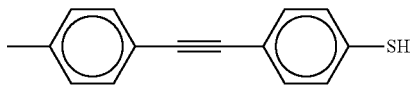

A non-limiting list of additional molecular wires includes 2-mercaptopyridine, 2-mercaptobenzothiazole, dithiothreitol, 1,2-benzenedithiol, 1,2-benzenedimethanethiol, benzeneethanethiol, and 2-mercaptoethylether. Conductivity of a SAM can also be enhanced by the addition of molecules that promote conductivity along the surface of the article. Conducting SAMs can be composed of, but are not limited to: 1) poly(ethynylphenyl) chains terminated with sulfur; 2) an alkyl thiol terminated with a benzene ring; 3) an alkyl thiol terminated with a DNA base; 4) any sulfur terminated species that packs poorly into a monolayer; 5) all of the above plus or minus alkyl thiol spacer molecules terminated with either ethylene glycol units or methyl groups to inhibit non-specific adsorption. Thiols are described because of their affinity for gold in ready formation of a SAM. Other molecules can be substituted for thiols as known in the art, for example, from U.S. Pat. No. 5,620,850, incorporated herein by reference.

In one aspect, the invention relates to optical filters utilizing particles such as colloid particles. Typical currently-known techniques for fabricating filters pose challenges, including control over thickness of various layers, difficulty in fabrication of filters at dimensions small enough for use in some technologies (for example, optical fibers), and the like. The present invention can provide control over fabrication dimensions at very small scale, for example, at the molecular scale rather than at a macroscopic scale, and often results in less material waste than prior art techniques.

As used herein, "optical" refers to interaction with electromagnetic radiation, not limited to visible light. For example, an optical device of the invention can be constructed and arranged for response to, control of, or interaction with essentially any electromagnetic radiation, for example, ultraviolet, infrared, or near-infrared radiation. It is to be understood that whever "optical" is used herein, other phenomena such as electro-optical energy or radiation can be involved as well. That is, the invention facilitates interaction of material, for example at surfaces, with a wide variety of forms of energy or radiation, such as optical energy and other electromagnetic radiation, electro-optical energy (energy having an electric component such as an electric field component), and the like.

In some embodiments, the present invention involves using colloids, i.e. nanoparticles, in the construction of new optical materials and novel applications of those materials. The invention also involves, in some cases, controlling the interaction of many wavelengths of electromagnetic radiation with these materials. Those of ordinary skill in the art will readily understand which wavelengths of electromagnetic radiation would or would not be suitable for control using the techniques of the present invention. Thus, in most cases, specific wavelengths of electromagnetic radiation or ranges of wavelengths are not described herein for various uses. As used herein, "light" is synonymous with electromagnetic radiation, and is not intended to be limited to any particular wavelength range of electromagnetic radiation, such as visible light.

The present invention provides a series of techniques for the construction and/or modification of optical materials that can be applied in devices designed to interact with and thereby affect electromagnetic radiation, and devices that affect electromagnetic radiation, typically through selective reflection or transmission of electromagnetic radiation, or random selectivity and transmission, reflection, or scattering of electromagnetic radiation. In one embodiment, the invention involves improvements in devices and systems including filters, displays, and coatings for glare reduction and the like. Applications of the invention can include use in the fields of RF antennas and reflectors, nanoscopic lasers, optical filters, optical switches, displays, materials for stealth coatings for military equipment, and the like.

In some embodiments, the techniques and devices of the invention may utilize small particles (e.g., colloid particles) that can interact with electromagnetic radiation. The particles can be magnetic (i.e., attracted to, repelled by, or otherwise affected by a magnetic field), or non-magnetic, and the particles can be metal, polymeric, ceramic, organic, inorganic, or the like. In some embodiments, particles of a variety of types and/or sizes can be used. The particle(s) chosen for an application depend on the specific application; for example, a magnetic particle may be chosen if the particle will interact with an applied magnetic field, a nanoparticle of a certain size may be chosen to interact with certain electromagnetic frequencies, etc. In some cases, the particles may be chosen for their ability to support a surface plasmon wave, induce a change in the optical properties of a material (for example, such as altering the dielectric constant), and/or be affected by an electromagnetic field.

Herein, new optical materials and devices are described, in which particles are incorporated. The optical materials and devices of the invention may be constructed and arranged for a response to, control of, and/or interaction with essentially any electromagnetic radiation, electric field, and/ or magnetic field. For example, the addition of particles to any medium, including fluids, gases and polymers, may change one or more electrical and/or optical properties, such as the dielectric constant of the material. The composition of the particles can also be chosen such that the electronic characteristics of the material are altered. The incorporation of particles, whose size and composition can be varied in some cases, may provide a flexible platform for tailoring the optical or electro-optical properties of a substrate, in either a static or dynamic manner. Additionally, the size of the particles can be varied, for example, in the X-Y plane and/or the X-Z plane, for example, to enable the construction of certain composite materials with nanoscale features.

Referring now to FIG. 1, the construction of one embodiment of an optical material of the invention is illustrated. Device 10 of FIG. 1 includes a first material 12 defining a first layer, a thin metal film 14 on one surface of layer 12, a self-assembled monolayer 16 on thin metal film 14, and a layer of particles 18 on the SAM (which can be colloid particles and/or nanoscopically-sized particles, but need not be). Thin metal film 14 is deposited by conventional means on one surface of lower substrate 12. A self-assembled monolayer (SAM) 16 is deposited on and covers at least a portion of the thin metal film 14, for example, as described in International patent publication WO 00/43783. In the arrangement illustrated, thin metal film 14 can serve at least two purposes, i.e., to assist in the alteration of the optical properties of the device, and/or to serve as a substrate for the deposition of SAM 16. In one embodiment, SAM 16 presents functional groups that are capable of binding to (e.g., attaching to) functional groups on the particles. Particles 18 may be attached to the SAM. In one embodiment, each of particles 18 can carry another SAM on its surface, functionalized so as to bind to SAM 16. As one example, SAM 16 can include an exposed binding partner that binds to a complementary binding partner immobilized by SAMs on particles 18. A second material 20 may be provided over the layer of particles 18. In some cases, material 20 may be another layer of particles of different size, composition, or deposited at a different density. Material 20 can also be a layer of material free of particles, for example, a layer of polymeric material, or other material having a dielectric constant different from the layer represented by particles 18. Material 20 may be, for example, a layer of polymeric material, embedded within which is an arrangement of particles such as colloid particles having a different size, composition, and/or density, relative to that of layer 18. It is to be understood that the SAM is presented as one technique for positioning the particles, but the particles could be positioned on metal film 14 by other techniques, such as evaporation of a fluid in which the particles are suspended, or the like. Moreover, metal film 14 need not be present, and particles 18 can simply separate materials 12 and 20 in some embodiments. For example, particles 18 may be present as the sole material separating layers 12 and 20. Such an arrangement can be achieved, for example, by evaporation of a fluid in which the particles are suspended on a top surface of material 12, followed by encapsulation with material 20.

The arrangement of FIG. 1 may allow for precise control over the optical properties of a layer defined by particles 18, or defined by a combination of particles 18 and metal layer 14, by manipulating the thickness of the layer, the density of particles, the size of particles and/or the composition of the particles. The particle composition may be chosen in order to take advantage of inherent optical or electronic properties. The spacing between metal layer 14 and particles 18 may be controlled, in some cases, by the appropriate selection of molecules defining SAM 16. The density of particles defining layer 18 (i.e., the average spacing between particles) can be controlled as well in some instances. SAM 16 can be defined in some cases by molecules carrying functional groups selected to bind to the particles (or to bind to molecules carried by the particles, optionally via SAMs on the particles), in combination with SAM-forming molecules free of functional groups. By decreasing the ratio of SAM-forming molecules carrying functional groups relative to SAM-forming molecules free of functional groups, the density of particles defining layer 18 may be controlled or decreased in some cases, i.e., the average spacing between particles may be increased. This may have certain effects, including altered dielectric properties, changes in one or more dimensions of a spatially addressable array, and intra—as well as inter-particle surface plasmon effects, that will be understood by those of ordinary skill in the art, some of which will be described herein. Materials 12 and 20 (and other, similar materials described herein) can be essentially any materials that satisfy the requirements for any optical devices desired. A wide variety of materials are well known and may be selected by those of ordinary skill in the art; thus, a detailed description of these materials will not be provided here. However, a non-limiting list of typical materials includes glasses, transparent polymers, gels, fluids and gases. Combinations of these and/or other materials may also be used in some cases. These materials can be electrically insulating, or they can be semiconductors or conductors. An overall matrix resulting from combination of one or more of these materials with particles such as nanoparticles, as described herein, may be made insulating, semiconductive, conductive, etc.

The methods of the invention may offer a distinct improvement over existing methods for applying different optical or electro-optical properties to adjacent or proximal locations on a substrate. The advantage of using nanoparticles may be especially noticeable when the overall feature size needs to be small. For example, the resolution of a display, as well as the overall size of the image, may require the construction of arrays of optical materials having a very small feature size. Further, methods of the invention provide more control over transition at boundaries between adjacent or proximal locations on a substrate than fabrication methods provide.

The methods of the invention may offer an improvement over other techniques by using nanoscale particles as building components to construct nano- and microscale features. Colloidal particles can readily be produced with diameters 10 nm, 5 nm, or even less in certain cases. Collections of nanoparticles can be assembled onto a substrate to form nano-scale features. Further, each particle may act as a discrete optical or opto-electric feature in some cases. Thus, the use of nanoparticles to produce certain desired optical characteristics to a material enables the fabrication of articles with feature sizes comparable to the dimensions of the particles. In some cases, feature sizes of less than 20 nm, less than 10 nm, less than 5 nm, etc. may be achieved using the present invention.

In one set of embodiments, novel optical and electro-optical materials can be made by embedding particles (for example, colloid particles) in a medium. One example approach is to construct a particle-studded matrix. The matrix may include any material that the particles can become embedded in, for example, materials such as the materials discussed above in relation to optical devices. A non-limiting list of typical materials includes, for example, glasses, transparent polymers, gels, fluids, and gases. In some cases, combinations of these and/or other materials may also be used within the matrix. There are many available methods for building 3-D nanoparticle matrices. For example, linker molecules or polymers may be used to interconnect various particles. In one embodiment, the linker molecules can be selected from a group of molecules that align or adopt a certain orientation in an electric or electromagnetic field. Examples of alignable molecules include, for example, molecules such as the ones disclosed in U.S. Pat. No. 4,978,476, or U.S. Pat. No. 4,779,961. In some cases, one or a series of parallel and orthogonal fields may orient the linker molecules into a uniform matrix. The particles, which may be free in solution in some cases, may also include functional groups able to react with groups on the linker molecules. Upon the introduction of a reaction reagent (which could be, for example, a catalyst, an enzyme, or a light source), the functionalized particles and linker molecules may become connected, which, in some cases, may preserve the geometry originally defined by the electric fields applied. In this way, a uniform, crystalline-type matrix may be achieved. For this use, the particles may be composed of, for example, magnetic material such that the placement of the particles within the matrix may be controllable. In another embodiment, particles such as colloidal particles, placed in a repeating geometry or matrix, may mimic the crystalline lattice of a metal, thus enabling the nanoparticle-studded matrix to take on the properties of the bulk metal. In another embodiment, particles (for example, particles within a gel, a fluid, etc.) may be recruited to a surface, for instance, electrostatically.

Figure 2:
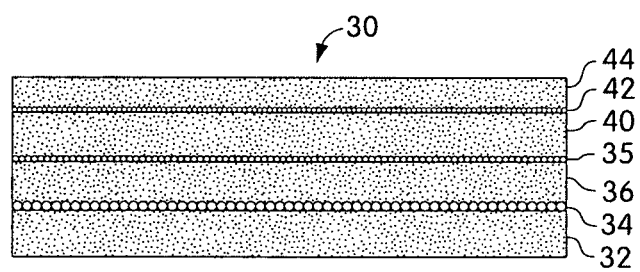
FIG. 2 illustrates another embodiment, having layers of the optical material in accordance with the invention.

As another example, in the arrangement of FIG. 2, a material of the invention may have more than one layer of particles. In this particular example, different sizes of surface-attached particles may select for the transmission or reflectance of one wavelength over another. The layered arrangement can be tailored to selectively reflect or transmit light of a targeted wavelength.

In some cases, it is desirable for a layer defined by particles to be electrically conductive, or to have low electrical resistivity or a low impedance. Those of ordinary skill in the art will recognize when such an arrangement is desirable. Examples of arrangements where electrical conductivity may be desirable include, but are not limited to, optical displays and artificial dielectrics. Electrical conductivity within a particle layer can be achieved by a variety of ways. With reference to FIG. 1, SAM 16 can be defined by a certain density of conductive SAM-forming species (e.g., molecular wires) to achieve a desired electrical conductivity between metal layer 14 and the particles defining layer 18. In another embodiment, particles 18 may be provided in a sufficient density such that certain intra- and/or inter-particle electronic effects may be enabled. These effects can include, but are not limited to, conductivity between particles or induced surface plasmon waves, as well as electro-optical effects. In other embodiments, electrically-conductive linker molecules can interconnect the particles (e.g., using molecular wires, functionalized at each end in a moiety that binds to one or more particles, or to a functionality presented by the particles), the particles can be connected to conductive polymers, or the like. Any combination of these and other techniques may be used as well.

Figure 3:
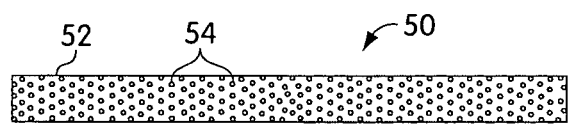
FIG. 3 depicts a device including a number of layers of the optical material in another embodiment of the invention.
Figure 4:
FIG. 4 illustrates a component including the layer of FIG. 2, reduced in thickness in accordance with an embodiment of the invention.

It may be highly desirable, in some arrangements, to construct materials with dynamic, as opposed to static, optical or electro-optical characteristics. Several techniques of the invention for doing so will now be described. Referring now to FIG. 3, component 50 (which can define a layer of the material of this invention) may be defined by material 52, within which is embedded a plurality of particles 54. In some embodiments, particles 54 are magnetic and/or colloidal, and the particles may be of any size and any size distribution range suitable for use in the device. The thickness of component 50 may be controlled, in some cases, by the application of an appropriate magnetic field, which may be arranged so as to cause particles 54 to condense, as illustrated in FIG. 4. In this arrangement, material 52 may be selected so as to be flexible in this manner, optionally with elastic properties, for example, such that the component is reversible, for example, with a change in thickness. Suitable materials may include, for example, encapsulated fluids, gels, and/or elastomeric polymers (e.g., elastomers) which may be flexible enough such that material may be displaced laterally to reduce thickness; materials including compressible voids such as foams, and the like. Of course, the components may be selected to achieve a desired optical result. For example, a foam may be selected such that the foam does not unacceptably scatter light when within the component.

Another technique of the invention for controlling the thickness (or other dimension) of component 50 is the use of linker molecules that can interconnect particles 54 and, in some cases, change in conformation upon the application of a stimulus. For example, linker molecules are known that can change in conformation when exposed to an electric field, and can be arranged in accordance with the present invention in such a way to draw together (e.g., by compressing or condensing) particles interconnected by the linker molecules when exposed to the proper stimulus, for example, an applied field. Such linker molecules can be functionalized in some cases for attachment to particles by any known technique. For example, where particles 54 define SAM-derivatized gold colloids, the SAM can carry molecules that are binding partners of molecules to which the linker molecules are attached. The particles can be connected to linker molecules via, for example, binding or covalent attachment. In this arrangement, of course, particles 54 are not necessarily magnetic.

Linker molecules that interconnect the particles may, in some cases, change in conformation upon the application of a stimulus such as an electric, magnetic, or electromagnetic field. Linker molecules are known that change in conformation when exposed to an electric field, and can be arranged in accordance with the invention in such a way to draw together particles interconnected by those molecules when exposed to the field. The material design can thus be "tuned," such that the length of the linker molecule may adjust the spacing between the particles, which may alter the optical properties of the matrix. In some cases, the spacing may be varied, for example, to selectively transmit or reflect one wavelength over another.

In another set of embodiments, component 50 can be defined by particles 54 that define a lattice of interconnected functionalized particles to, for example, polymers or other linker entities. In one embodiment, the particles can be magnetic, and thickness of component 50 can be controlled, for example as described above. In another embodiment, the polymers can incorporate one or more units that are susceptible to and can change conformation upon exposure to an applied field, for example, an electric field.

Another technique for arranging particles such as colloid particles at a desired location in a desired spatial arrangement with respect to each other can be carried out as follows. Rather than attaching the particles directly to a surface of a solid, or a relatively solid article, the particles can be provided in a fluid such as a liquid or a gel, at least a portion of which is subsequently allowed to harden resulting in placement of the particles at a desired location. Referring to FIG. 1, one or both of 12 and 20 can initially be a fluid that is at least partially hardened during assembly to result in the structure shown. In this arrangement, components 14 and/or 16 may be absent. Similarly, with reference to FIG. 2, one or more of components 32, 36, 40, and 44 can initially be in a fluid state. In one set of embodiments, two immiscible (i.e., incompatible) fluids can be selected that will form an interface at their boundary, at which the particles will spontaneously locate. For example, two fluids can be selected to have differences in hydrophobicity (and/or differences in lipophilicity), and/or differences in density, causing one fluid to form a first, bottom layer and the other fluid to form a layer above the first fluid, the fluids forming an essentially planer interface. Those of ordinary skill in the art can select such fluids (e.g., with reference to each fluid's polarity), in conjunction with suitable colloid particles, so that the colloid particles will self-assemble at the interface. In this type of arrangement, the particles typically will be attracted to each other due to capillary forces present in the system, while being repulsed from each other by dipole-dipole interactions between the particles induced by the polarity of one of the fluids, or by a polarity difference between the fluids. In such a system, the particles typically will self-assemble in a pattern unique to the system, and expansion and contraction of the pattern (e.g., the distance between colloid particles) can be controlled. For example, particles at the interface of a highly aqueous fluid and a highly oil-based fluid typically can self-assemble into an ordered hexagonal pattern, and the spacing between colloids can be manipulated by carefully choosing or altering hydrophobicity, hydrophilicity, and/or polarity of one or both of the fluid phases. The particles at the interface may also be controlled, in some cases, by varying the particle size, as previously described.

The fluids can readily be chosen by those of ordinary skill in the art to harden spontaneously over time, or upon exposure to a particular stimulus or energy source. For example, pre-polymeric fluids can be chosen which polymerize, and thereby harden, upon exposure to heat, electromagnetic radiation, and/or another stimulus. Similarly, a polymeric fluid can be crosslinked and thereby hardened using known techniques. An aqueous-based fluid can harden by crystallization, or can include enough prepolymer or crosslinkable polymeric material to be hardenable while still functioning as an aqueous fluid for the purposes of controlling the positioning of colloid particles.

With reference to FIG. 2, a multi-layer structure may be created by first positioning particles 34 at the interface between fluids defining components 32 and 36 and hardening components 32 and 36 to the extent necessary to immobilize the particles, but not to the extent that particles 35 between 36 and added component 40 cannot not be made to self-assemble. For example, component 32 may be hardened, and the bottom portion of component 36 may be hardened (e.g., via selectively heating component 36 from the bottom up or irradiating from the bottom to harden the bottom portion of component 36 while leaving the top portion fluid) with the process repeated as the layered structure grows. Alternatively, multi-layered fluids including particles positioned at fluid/fluid interfaces can be created, followed by hardening of the fluids. See, for example, M. G. Nikolaides, A. R. Bausch, M. F. Hsu, A. D. Dinsmore, M. P. Brenner, C. Gay, and D. A. Weitz, "Electric-field-induced capillary attraction between like-charged particles at liquid interfaces," *Nature*, Vol. 420:299-301 (2002).

Fluids for use in this technique can be easily selected by those of ordinary skill in the art. First, contact angle measurements can be conducted and those of ordinary skill in the art can readily determine whether various fluids will be miscible or immiscible. Additionally, surface tension data on various fluids can be obtained from literature or calculated from multiple contact angle measurements using different liquids of know surface tension. Moreover, fluids may simply be mixed and miscibility, or immiscibility can be determined. Those of ordinary skill in the art can easily select fluids that are conveniently hardenable.

It should be noted that, although electrically conductive and magnetic particles have been described, other particle types, including, but not limited to, non-conductive or semiconductor particles, or particles with pre-selected properties such as fluorescence, or other optical properties, etc., can also be used with certain methods of the invention. The components having the optical materials of this invention can be utilized to construct a variety of devices, as can be determined by those of ordinary skill in the art.

In some cases, the optical filters of the present invention can be of a design based on the unique properties of the material described herein, hereinafter referred to as configuration resonance filters, or can be of conventional design, but utilizing one or more materials of the present invention.

Conventional design optical filters may also be modified in certain embodiments. For example, device 10, as shown in FIG. 1, can take the form of a conventional optical filter defined by materials 12 and 20, and separated by thin metal film 14, but with the inventive addition of self-assembled monolayer 16 and/or particles 18. As another example, artificial dielectrics may be formed. Artificial dielectrics are formed by a suspension or a matrix of conducting spheres or by patches of conducting material (see, for example, R. Collins, Field Theory of Guided Waves, John Wiley & Sons, 1990). The size and spacing of the particles may also be chosen to obtain an effective dielectric constant at a given wavelength.

In one embodiment, the size and spacing of the particles, various characteristics of the metal film and/or the density of conductive SAM-forming species (e.g., molecular wires) can be chosen so that at a certain angle (and/or for a predetermined polarization), the interaction between the transmitted or evanescent waves and the surface plasmon can satisfy a certain resonant condition. Evanescent waves are known in the art, for example, as discussed in J. Homola, S. S. Yee, and G. Gauglitz, "Surface Plasmon Resonance Sensors" (review), *Sensors and Actuators*, B-54:3-15 (1999).

Device 10, when used as an optical filter, may function in one embodiment as follows. Incident light, represented by arrow 22 is directed toward the device and passes through material 20 having a first dielectric constant to material 12 having a second dielectric constant. At a certain angle, the incident light couple with the surface plasmon (e.g., an electron wave through metal layer 14, layer 18 of particles, or both) and maximizes the magnitude of the transmitted light (represented by beam 24), relative to the reflective light (represented by beam 26). The angle α at which the transmitted light reaches a maximum may be a function of the thickness of the particle layer and/or the combination of the particle layer and metal film 14, the dielectric constant of material 12, and/or the wavelength of the incident light. By varying the size and/or density of particles defining layer 18, the thickness of the metal layer can be effectively adjusted to tailor the transmission and/or reflection of light as desired. For example, the size of the particles can be chosen to select for transmission or reflectance of one wavelength over another at a particular incident light angle and/or refractive index of materials 12 and/or 20. In some cases, the length of the linker molecules (e.g., SAM-forming molecules defining SAM 16) can be adjusted, for example, to adjust the spacing between particle layer 18 and thin film 14, which may alter certain optical properties; or to adjust the spacing between the particles (as discussed above) to alter certain optical properties of the particulate matrix. Thus, many aspects of device 10 can be varied to selectively transmit or reflect one wavelength of light over another.

Referring now to FIG. 2, a multi-layer device 30 can also be used as a filter, for instance, according to principles described above with respect to FIG. 1 and other principles known in the art. Device 30, in this particular embodiment, includes a first layer of material 32, a second layer of material 36, a third layer of material 40, and a fourth layer of material 44. Particle layer 34 separates layer 32 from layer 36, particle layer 35 separates layer 36 from layer 40, and particle layer 42 separates layer 40 from layer 44. "Separates" in this context (and in the context of FIG. 1 and other figures) does not necessarily mean that there is no contact between the materials or layers, but that the layer of particles generally falls between the two materials. Layers 32, 36, 40, and 44 may each have the same or different dielectric constants, compositions, and/or thicknesses, any of which can be selected by those of ordinary skill in the art to achieve a desired result, such as a certain optical property.

Particle layers 34, 35, and 42, as illustrated, differ in particle size and spacing. Of course, in other embodiments, two or more of particle layers 34, 35 and 42 may have particles with the same size and/or spacing. In certain cases, one or more particle layers may also include more than one size or spacing of particles. Particle layer 34, in this example, has relatively large particles, while particle layers 35 and 42 have relatively smaller particles. Additionally, in this particular example, the particle density of layer 42 is lower than that of particle layers 34 and 35 (i.e., the spacing between particles of layer 42 is generally greater than that of particle layers 34 and 38).

Thin metal layer 14 and SAM 16 in FIG. 1 are not illustrated in FIG. 3, although it is to be understood that a thin metal layer and/or SAM can be used at any location, for example, for the purpose of positioning the particles and/or controlling their density. Of course, the particles can be positioned using other techniques as well, e.g., without using a thin metal layer or a SAM. It is also to be understood that the arrangement of FIG. 3 is highly schematic and none of the figures are necessarily drawn to scale.

Those of ordinary skill in the art will be well aware of a variety of optical devices that can be constructed using the general principles illustrated herein, and can tailor the selection of material(s), thickness(es) of the material(s), types of particles, and/or arrangement of those particles as necessary to achieve a desired result.

In certain cases, the principle of thickness control, as described in part in connection with FIGS. 3 and 4, can be used to control the transmission or reflectance properties of a plurality of pixels in a display, such as a flat panel display. Pixels also can be made up of components, for example, with adjustment of transmission and/or reflectance properties controlled using, for example, the arrangements of FIG. 2 or 4.

Figure 5:
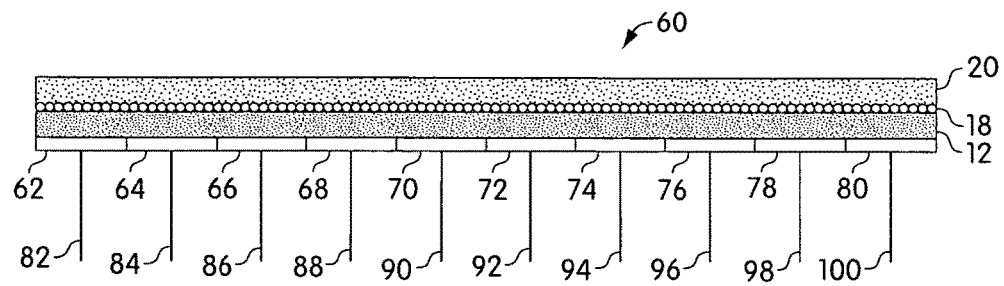
FIG. 5 is a side view of a flat panel display in accordance with one embodiment of the invention.

In another set of embodiments, displays such as flat panel displays can be formed by controlling or varying induced surface plasmon in particles at specific locations in an article. Referring to FIG. 5, a device 60 may be constructed similarly to device 10 of FIG. 1 including material 12, material 20, and particle layer 18. Although not shown, the arrangement can include a metal layer 14 and SAM 16, as illustrated in FIG. 1, for e.g. supporting and/or positioning the particle layer. Device 60 may include a plurality of separate electrical activators 62, 64, 66, . . . 80, addressed by electrical circuitry, as represented by leads 82, 84, 86, . . . 100. As illustrated, all particles in layer 18 of device 60 are of generally uniform size, of the same material, and are generally uniformly spaced. In some cases, individually-addressable sections, or activators, 62-80 may be capable of independently applying electric fields to the particles in layer 18 adjacent the activators. Thus, the device may provide the ability to independently apply electric fields to select, separate regions of particles arranged in a layer. Electrical fields close to the particles may induce surface plasmon waves in the particles, for example, where the strength of the induced surface plasmon can affect the wavelength or color of light that is preferentially reflected or transmitted. By rapidly and independently changing the electric fields at sections of particle layer 18, for example using proximate actuators 62-80, the strengths of the induced surface plasmon may be rapidly altered, which, in turn, may alter the selectivity of the wavelength of the reflected or transmitted light in those sections. Thus, in some cases, the electric fields can be turned on or off, or varied in intensity, to produce a desired image.

In the arrangement illustrated in FIG. 5, a two-dimensional array of individually-addressable electronic activators may be used to provide a two-dimensional flat panel display. Of course, the device of FIG. 5 can be arranged differently, for example, with a multi-layer arrangement such as the one shown in FIG. 2, optionally with a layer thickness control as illustrated in FIGS. 3 and 4, etc.

Figure 6:
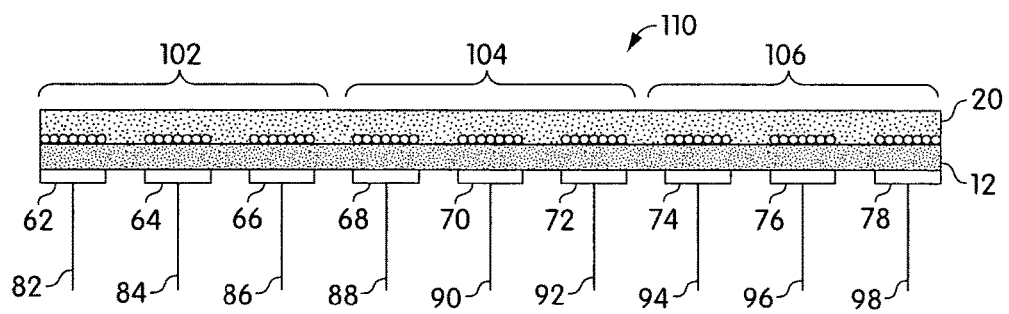
FIG. 6 is a side view of a flat panel display in accordance with an embodiment of the present invention.

Referring now to FIG. 6, another display device using particles is illustrated schematically. In this arrangement, device 110 includes materials 12 and 20, separated by particles in at least some regions, as well as a plurality of individually-addressable electrical activators 62-78 addressed by leads 82-98. The device of FIG. 6 includes, in contrast to particle layer 18 of FIG. 5, a plurality of individual regions of particles each in register with one of electrical actuators 62-78, and each separated from each other. In this particular example, three different sizes of particles are provided, with small particles in register with actuator 62, intermediate particles in register with actuator 64, large particles in register with actuator 66, then repeating again with small particles in registers with actuator 68, intermediate particles in register with actuator 70, large particles in register with actuator 72, etc. Of course, in other embodiments, the device may include any number of different sizes of particles, for example, four different sizes, five different sizes, or more in some cases. In other embodiments, the device may be constructed such that only one particle size is used. In this example, the small, intermediate, and large particles, as represented schematically, may be selected to be of different particle sizes, such that the device can reflect or transmit, selectively, the three primary colors. Thus, the three pixels 102, 104, and 106 can each reflect or transmit essentially any desired color at essentially any desired intensity, the color and intensity selected by relative electric fields applied by electrical actuators to particles of different size.

In one set of embodiments, device 110 of FIG. 6 can be constructed as a flat panel display, with a two dimensional array of pixels 102, 104, 106, . . . , each defined by the same or different-sized particles addressed by different electrical actuators. Device 110 can be fabricated by a variety of techniques. In one example technique, individual SAM islands may be arranged on the top surface of material 12 which may correspond to individual regions where particles are desirably immobilized. The SAM islands can be of any number of different types. In one embodiment, the SAM islands can be of three types, each of the different types carrying a different functionality. Each of the three different particle size groups (as illustrated, although additional sizes can be used) may be functionalized with a molecule that can be immobilized on one of the SAM islands. Techniques for selective SAM deposition and functionalization have been described in, for example, U.S. Pat. Nos. 5,512,131 and 6,355,198, referenced above. In one embodiment, a SAM can be provided uniformly across the top surface of material 12, with individual, isolated regions separately functionalized to immobilize particles of a particular size.

In some embodiments of the invention, where small displays or high pixel densities are desired, inventive methods to eliminate cross-talk between different particle regions are provided. Techniques for doing so involve, for example, using insulative molecules between the isolated particle regions, for example using insulative SAM-forming molecules. In some cases, topological design may be used to electronically insulate particle regions from each other. For example, the topology of surface 12, or the topology created by using different regions, thicknesses, and/or lengths of SAM-forming molecules may be used to prevent cross-talk between different particle regions within the device.

In some embodiments, the principles of thickness control previously described may be used to control the transmission or reflectance properties of pixels in a display. With reference to FIGS. 5 and 6, in some embodiments, electrical actuators 62-80 (FIG. 5) or 62-78 (FIG. 6) may be electromagnets positioned adjacent to component 50 of FIG. 3. Individual regions of component 50 can be selectively changed in thickness, which may, in some cases, selectively alter the transmission and/or reflectance properties of the material. In some embodiments, a plurality of pixels each may include several electromagnets (for example, three), each in register with a region constructed and arranged (through, e.g., thickness, particle size, and/or a combination of optical properties) to reflect or transmit a color such as one of the primary colors.

Of course, the present invention is not limited to displays, but may be employed in many other devices, where the control of optical properties is desired. For example, in some embodiments of the invention, similar arrangements of materials can define components useful in information technology, such as optical computers. It is a feature of the invention that such materials, or pixels, may be switched very rapidly between different states, which may interact with electromagnetic radiation differently in some cases, e.g., where the difference(s) can be detected and/or recorded. For example, a plurality of pixels similar to those described with reference to FIGS. 5 and 6 can define bits of an optical information storage medium in another set of embodiments of the invention. Electro-optical switches may also be formed in this manner in some embodiments.

Figure 7:
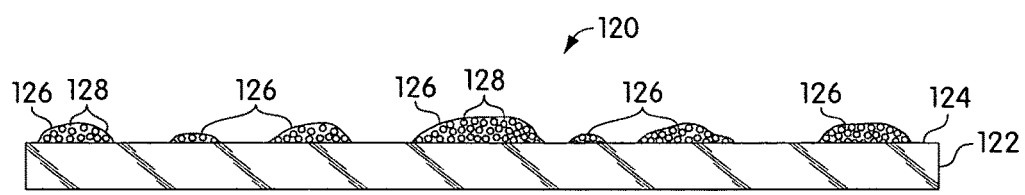
FIG. 7 is a side view of a glare-resistant device in accordance with one embodiment of the invention.
Figure 8:
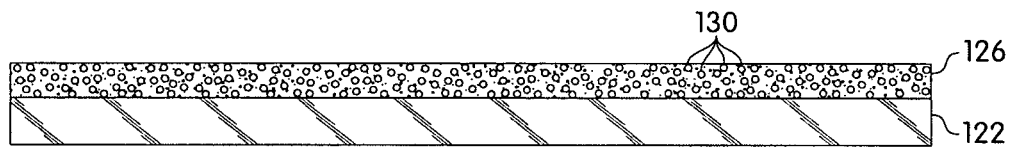
FIG. 8 is a side view of another glare-resistant device in accordance with an embodiment the invention.

Referring to FIG. 7, device 120 is illustrated schematically, demonstrating the effectiveness of particles of the invention in a glare reduction device 120. Device 120, in this embodiment, includes a transparent material 122, such as glass or a plastic, through which glare may be desirably minimized. On top surface 124 of material 122 a plurality of separate regions of material 126 is provided. The separate regions may be isolated from each other, and are of different size as shown in this example. Of course, in other embodiments, the regions may not necessarily be separated from each other, and/or the regions may include particles having the same or similar sizes. Material 126 may be polymeric in some cases, and may be applied by any known technique. In the present invention, material 126 incorporates a plurality of particles 128, which may each be the same size or have a range of sizes. Incorporation of these particles can alter the optical properties of the surface and may be used to minimize transmitted and/or reflected light, thereby controlling glare. In another arrangement illustrated in FIG. 8, material 122 carries, on its top surface, a uniform layer of material 126 embedded in which is a plurality of particles 130 of random size. The random size distribution of particles 130 alters the optical properties of the surface randomly, reducing glare.

In another arrangement (not shown) the thickness of layer 126 is varied across the top surface of material 120 due to the different sizes of particles 130, causing glare reduction. Glare reduction can be caused by random scattering, random cancellation, a combination, or other optical property.

In another set of embodiments, the present invention takes the form of radar-resistant, or radar-evading coatings or articles. The principal described above with respect to FIGS. 5 and 6 can be implemented so as to create, on a surface, a series of individual regions that can be controlled to interact differently with incident electromagnetic radiation, or to emit electromagnetic radiation differently from different regions, so as to confound radar detection of an article having the surface. Similarly, with respect to FIG. 7, a surface can be created which inherently interacts differently, at different surface locations, with incident electromagnetic radiation, confounding radar detection of an article bearing the surface. Optical devices of the invention can be constructed and arranged for a response to, control of, or interaction with essentially any electromagnetic radiation, electric field, and/or magnetic field.

Another aspect of the invention involves manufacture of components described herein by including, in those components, particles of the invention added in an amount sufficient to, and positioned effectively to, alter interaction of articles of the invention with electric, magnetic, and/or electromagnetic fields, and/or other energy sources as described herein.

Another aspect of the invention involves use of articles of the invention, for example, positioning articles of the invention so as to interact with the above-noted forms of energy and to change interaction of the articles with that energy relative to similarly-constructed articles absent particles of the invention, in a manner detectable by an instrument constructed and arranged to determine such source of energy or a by-product of such source of energy, or observable by a human as different relative to articles absent those particles. In one aspect, the invention provides articles "constructed and arranged" to interact with these forms of energy and to interact differently with these forms of energy relative to articles constructed absent particles of the invention. Those of ordinary skill in the art will understand the meaning of "constructed and arranged" in this context, for example, articles constructed and arranged to reduce glare, to act as optical filters, and the like.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims (as well as in the specification above), all transitional phrases such as "comprising", "including", "carrying", "having", "containing", "involving", "composed of", "made of", "formed of" and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, section 2111.03.

What is claimed is:

1. A device comprising at least two layers constructed and arranged to receive incident electromagnetic radiation and transmit at least a first wavelength of the incident radiation relative to at least a second wavelength of the incident radiation via interaction of the radiation at a region proximate an interface of the at least two layers, wherein the device further comprises a plurality of particles at least some of which are linked to other particles with species responsive to an electromagnetic field, such that the species are positioned to interact with the electromagnetic radiation so as to affect the preferential transmission of the first wavelength of radiation relevant to the second wavelength of radiation, wherein the particles are attached to a surface.

2. A device comprising: a component constructed and arranged to affect an electric, magnetic or electromagnetic field comprising a plurality of particles at least some of which are linked to other particles with species responsive to an electromagnetic field, such that the species are positioned to interact with the field and affect interaction of the field with the device, wherein the particles are attached to a surface.

3. A device comprising a plurality of pixels constructed and arranged to individually and differentially affect a proximal electric, magnetic, or electromagnetic field, at least some of the pixels comprising particles at least some of which are linked to other particles with species responsive to an electromagnetic field, such that the species are positioned to affect the field proximal that pixel, wherein the particles are attached to a surface.

4. A device comprising a surface comprising particles differentially positioned with respect to the surface to define a plurality of regions of the surface that differentially affect a proximal electromagnetic field, wherein the particles are attached to a surface, wherein at least some of the particles are linked to other particles with species responsive to an electromagnetic field.

5. A method of making a device for interaction with an electric, magnetic, or electromagnetic field, comprising: arranging a plurality of nanoparticles at least some of which are linked to other nanoparticles with species responsive to an electric, magnetic, or electromagnetic field; exposing the responsive species to an electric, magnetic, or electromagnetic field wherein the species are condensed thereby adjusting the spatial relationship between at least some of the nanoparticles relative to other nanoparticles, wherein the nanoparticles are attached to a surface.

6. A method as in claim 5, wherein the species are molecules covalently attached to the nanoparticles.

7. The device according to claim 1, wherein the particles are nanoparticles.

8. The device according to claim 2, wherein the particles are nanoparticles.

9. The device according to claim 7, wherein the nanoparticles are covered with SAM.

10. The device according to claim 3, wherein the particles are nanoparticles.

11. The device according to claim 4, wherein the particles are nanoparticles.

12. The device according to claim 8, wherein the nanoparticles are covered with SAM.

13. The device according to claim 10, wherein the nanoparticles are covered with SAM.

14. The device according to claim 11, wherein the nanoparticles are covered with SAM.

15. The method according to claim 5, wherein the nanoparticles are covered with SAM.

16. The device according to claim 1, wherein the species are covalently bonded to the particles.

17. The device according to claim 2, wherein the species are covalently bonded to the particles.

18. The device according to claim 3, wherein the species are covalently bonded to the particles.

19. The device according to claim 4, wherein the species are covalently bonded to the particles.

20. The method according to claim 6, wherein the species are elastomers.

* * * * *